(12) United States Patent
Kunz

(10) Patent No.: US 11,624,643 B2
(45) Date of Patent: Apr. 11, 2023

(54) UNIT FOR DETECTING THE FILLING LEVEL OF A LIQUID IN A CONTAINER, BRAKING SYSTEM, AND METHOD

(71) Applicant: Robert Bosch GmbH, Stuttgart (DE)

(72) Inventor: Michael Kunz, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 16/651,528

(22) PCT Filed: Sep. 12, 2018

(86) PCT No.: PCT/EP2018/074676
§ 371 (c)(1),
(2) Date: Mar. 27, 2020

(87) PCT Pub. No.: WO2019/072484
PCT Pub. Date: Apr. 18, 2019

(65) Prior Publication Data
US 2020/0264032 A1     Aug. 20, 2020

(30) Foreign Application Priority Data

Oct. 10, 2017   (DE) ..................... 10 2017 217 976.7

(51) Int. Cl.
*B60T 17/22*   (2006.01)
*B60T 17/06*   (2006.01)
(Continued)

(52) U.S. Cl.
CPC ............... *G01F 23/74* (2013.01); *B60Q 9/00* (2013.01); *B60T 11/26* (2013.01); *B60T 17/06* (2013.01); *B60T 17/225* (2013.01)

(58) Field of Classification Search
CPC .......... B60T 11/22; B60T 11/26; B60T 17/06; B60T 17/22; B60T 17/225; G01F 23/60; G01F 23/603; G01F 23/72; G01F 23/74
See application file for complete search history.

(56) References Cited

U.S. PATENT DOCUMENTS 3,184,566 A    5/1965  Kleinpeter
3,560,918 A *  2/1971  Lewis ..................... G01F 23/30
                                                    200/82 D
(Continued)

FOREIGN PATENT DOCUMENTS

CN    101324461 A    12/2008
CN    101957228 A    1/2011
(Continued)

OTHER PUBLICATIONS

International Search Report for PCT/EP2018/074676, dated Jan. 7, 2019.

*Primary Examiner* — Thomas J Williams
(74) *Attorney, Agent, or Firm* — Norton Rose Fulbright US LLP; Gerard A. Messina

(57) ABSTRACT

A unit for detecting a filling level of a liquid in a container. The unit includes at least one float gauge, which carries at least one permanent magnet, and including at least one switching unit, which is actuatable by the permanent magnet and is fastened in or at the container. It is provided that at least one energizable magnetic device for generating a magnetic field is assigned to the switching unit, which, when sufficiently energized, generates a magnetic field, which actuates the switching unit when the switching unit is functional.

8 Claims, 2 Drawing Sheets

(51) Int. Cl.
  *G01F 23/74* (2006.01)
  *B60Q 9/00* (2006.01)
  *B60T 11/26* (2006.01)

(56) References Cited

U.S. PATENT DOCUMENTS

| | | | | |
|---|---|---|---|---|
| 2012/0056749 A1* | 3/2012 | Smith | ................. | G08B 21/182 |
| | | | | 340/623 |
| 2015/0217750 A1* | 8/2015 | Sussek | ................. | B60T 17/221 |
| | | | | 701/70 |

FOREIGN PATENT DOCUMENTS

| | | | | |
|---|---|---|---|---|
| CN | 201716081 U | | 1/2011 | |
| CN | 106662480 A | | 5/2017 | |
| DE | 2210298 A1 | | 9/1973 | |
| DE | 3635241 A1 | | 4/1988 | |
| DE | 4011949 A1 | * | 10/1991 | |
| DE | 102004054018 A1 | * | 5/2006 | ........... G01F 23/241 |
| EP | 0464529 A2 | * | 1/1992 | |
| GB | 1107297 A | | 3/1968 | |
| JP | S5658420 U | | 5/1981 | |

\* cited by examiner

UNIT FOR DETECTING THE FILLING LEVEL OF A LIQUID IN A CONTAINER, BRAKING SYSTEM, AND METHOD

FIELD

The present invention relates to a unit for detecting a filling level of a liquid in a container, including at least one float gauge, which carries at least one permanent magnet, and including at least one switching unit, which is actuatable by the permanent magnet and is fastened in or at the container.

Moreover, the present invention relates to a braking system including such a unit and to a method for operating the unit or the braking system.

BACKGROUND INFORMATION

In order to determine the filling level of liquids, which are carried along in the motor vehicle as operating means, such as brake fluid or cooling water, or the like, conventional units are provided, which automatically monitor the filling level of the liquid in the container storing them. In the process, it is not absolutely necessary to detect the specific filling level, but rather to detect whether the filling level falls below a critical value. In order to detect this, conventional units include a float gauge, which is carried by the liquid, so that its vertical position in the container corresponds to the liquid level of the liquid. If the volume of the liquid in the container and, therefore, the filling level of the liquid sinks, the float gauge sinks along with the liquid. In addition, a switching unit, which has a fixed position, is situated at the container. The switching unit is magnetically actuatable, the float gauge carrying a permanent magnet, which, when entering a sufficient proximity to the switching unit, actuates the switching unit with the aid of the magnetic field it has generated. The actuation of the switching unit may be understood to mean an opening or a closing of an electrical contact in the switching unit. A reed contact, for example, is utilized as such a switching unit.

SUMMARY

An example unit according to the present invention may have the advantage that the functional capability of the switching unit is checkable at any time and easily. According to the present invention, it is provided, for this purpose, that at least one energizable magnetic device for generating a magnetic field is assigned to the switching unit, which, when sufficiently energized, generates a magnetic field, which actuates the switching unit when the switching unit is functional. The switching unit may therefore be actuated, as necessary, by energizing the magnetic device, by applying an appropriate voltage, regardless of the position of the permanent magnet. As a result, a simple function test of the switching unit is implementable. If the magnetic device is energized and an expected response is detected at the switching unit in the form of a current flowing or not flowing through the switching unit, the functional capability of the switching unit is established. If the expected response fails to appear, however, it is established that a malfunction must be present at the switching unit and, therefore, the detected filling level is not permitted to be trusted. If, for example, an unexpected response is detected, a warning message is automatically output by the unit to a driver of the motor vehicle and/or to a higher-order control unit, so that assistance measures are initiated.

Preferably, the magnetic device encompasses at least one energizable coil. A magnetic field, which may perform the above-described function, is generated in an advantageous way via a simple energization of the coil. The coil is cost-effectively manufacturable and easily integratable into the unit. Alternatively, it is preferably provided that the magnetic device encompasses an energizable electromagnet, which is also designed for generating an electric field upon energization.

According to one preferred specific embodiment of the present invention, it is provided that the coil is designed to be coaxial with respect to the switching unit. Therefore, the coil encompasses the switching unit and generates, also in the case of low current or low voltage, a sufficient magnetic field, which suffices for actuating the switching unit. As a result, a compact and efficient design of the unit is provided. If the magnetic device is designed as an electromagnet or includes an electromagnet, the electromagnet is preferably situated next to the switching unit or at the switching unit, although only on one side thereof, in order to generate a targeted magnetic field for actuating the switching unit.

Moreover, it is preferably provided that the switching unit and the coil are electrically connected to a testing unit, the testing unit being configured for detecting a current flowing through the switching unit and activating the coil. With the aid of the testing unit, therefore, the above-described test function is implementable, and the switching unit is actuatable, for testing purposes, with the aid of the coil or the magnetic device. The testing unit is preferably situated at the container, so that short electrical connecting paths or wirings to the switching unit and to the magnetic device exist.

Moreover, it is preferably provided that the coil includes a first and a second electrical coil terminal, and that the switching unit includes a first and a second electrical switch terminal, the terminals each being directly connected to the testing unit. The direct connection is understood to mean such a connection in which no further elements, apart from electrical lines, are interconnected and no interconnections of the terminals among one another takes place. Due to the testing unit, therefore, the coil is activatable independently of the switching unit, so that an advantageous evaluation of the test result may take place. It may be disadvantageous in this case that four terminals of the unit are situated within the container and must be routed toward the outside, which results in an increased wiring complexity as compared to conventional units that include a reed contact. Since, in addition, the elements within the container must be protected against the carried-along liquid, an appropriately increased sealing outlay is necessary for sealing off the electrical connections.

Alternatively, it is preferably provided that the first coil terminal is directly connected to the first switch terminal and the second coil terminal is directly connected to the second switch terminal. As a result, the coil is directly electrically connected to the switching unit and does not need a separate terminal for the connection to the testing unit. Due to the interconnection of the coil and the switching unit to one another, a simple approach for operating the unit has been found, in the case of which, via the application of a voltage to the switching unit, a current is simultaneously generated through the coil, which generates the magnetic field for actuating the switching unit. Provided the generated magnetic field is not yet sufficient for actuating the switching unit, the current flowing through the unit of the switching unit of the coil corresponds to the connected voltage and the electrical resistance of the coil and, therefore, may be easily evaluated. As soon as the switching state of the switching unit changes due to the increasing magnetic field, this is easily detectable by the unit due to a change of the current flow. As a result, it may be easily differentiated whether the switching unit has switched or not. If a switching process fails to appear, because a malfunction is present in the switching unit, the detected actual current behaves differently, because the short-circuiting of the electrical connection with the aid of the switching unit and/or the interruption of this electrical connection do/does not take place.

As described, the switching unit and the coil preferably form a unit, in particular a mechanical unit, which is manageable as a component or an assembly, and, in particular, includes only two electrically contactable terminals. As a result, a simple electrical contacting is possible in combination with low wiring complexity and sealing outlay, which corresponds to the outlay associated with a conventional unit. Nevertheless, the aforementioned advantages are provided, so that the aforementioned testing function is implementable despite this simple contactability.

Moreover, it is preferably provided that the testing unit is configured for regularly applying a voltage to the two terminals of the unit or the coil, which, at least intermittently, is so high that the magnetic field of the coil generated as a result should actuate the switching unit. The testing unit is therefore designed for regularly carrying out the testing of the switching unit. For this purpose, it regularly applies the voltage to the unit or only to the coil, and detects the current flowing through the switching unit. If the coil and the switching unit each include separate terminals, which are connected to the testing unit, the testing unit also applies a voltage to the switching unit as well as to the magnetic device.

Moreover, it is preferably provided that the testing unit is configured for detecting the current flowing through the unit or the switching unit and, depending on the detected current, for determining the functional capability of the switching unit. As mentioned above, the functional capability of the switching unit is determined depending on the detected current, which flows through the switching unit, because a switching or a change of the switching state of the switching unit is easily read in the current profile. If, for example, the switching unit is actuated, so that the electrical contact is closed, this is detected in the form of an abrupt rise of the detected current. If the switching unit is actuated, so that an electrical contact is interrupted, this is detected in the form of a sudden drop of the detected current.

The example braking system according to the present invention includes the unit according to the present invention. This yields the aforementioned advantages. Further advantages and preferred features and combinations of features result, in particular, from the above description.

Correspondingly, the example method according to the present invention may provide that a voltage is present at the terminals of the unit or the coil and the current flowing through the unit or the switching unit as a result is detected and compared to an expected current or an expected current profile, the functional capability of the switching unit being determined depending on the comparison. This yields the aforementioned advantages. Preferably, the voltage is predefined having a slowly rising voltage profile, so that the switch point of the switching unit is reliably detectable. In this way, it is also provided, in particular, that the voltage is increased from 0 V to a predefined maximum value, such as 5 V or 12 V, within a time period of, for example, less than 3 seconds, in particular 1 second. Further advantages and preferred features and combinations of features result, in particular, from the above description.

The present invention is to be explained in greater detail in below with reference to the figures.

DETAILED DESCRIPTION OF EXAMPLE EMBODIMENTS

Figure 1:
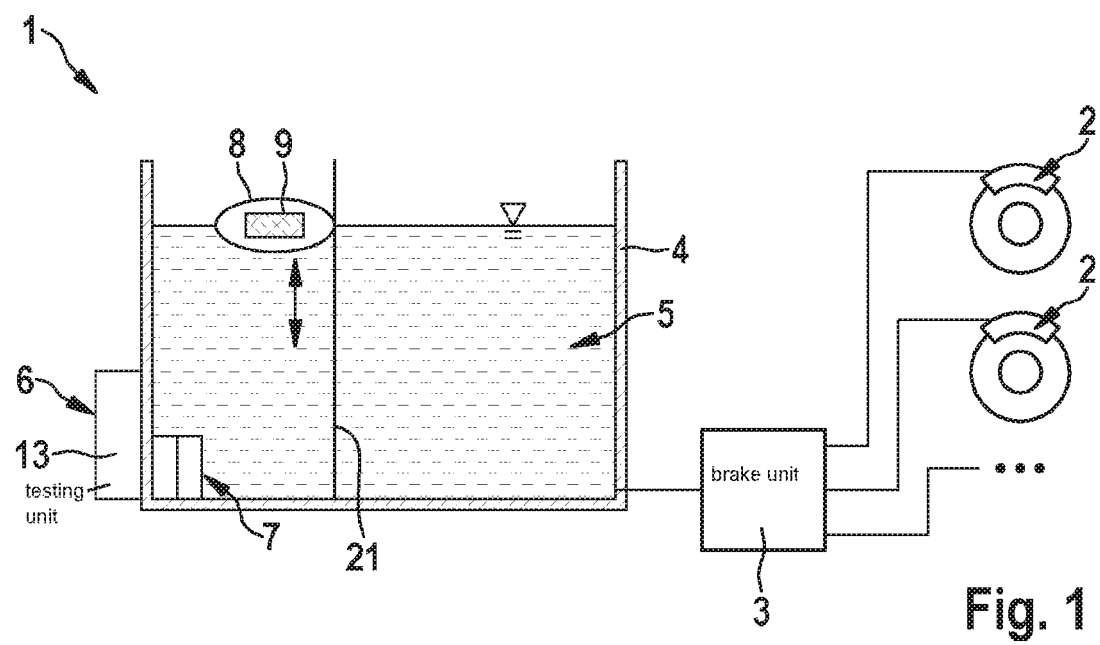
FIG. 1 shows parts of a braking system of a motor vehicle.

FIG. 1 shows, in a simplified representation, parts of a braking system 1 for a motor vehicle, which includes multiple hydraulically actuatable wheel brakes 2, which are hydraulically actuated by a brake unit 3, for example, an ABS or ESP unit. For this purpose, braking system 1 includes a hydraulic circuit, which, inter alia, also includes a container 4 for liquid 5 utilized in braking system 1.

In order to monitor the filling level of the liquid located in container 4, brake fluid in this case, and, in particular, to detect whether the filling level falls below a critical value, a unit 6 is assigned to container 4, which includes a magnetically actuatable switching unit 7 fixedly situated at container 4. In addition, a float gauge 8 of unit 6, which carries a permanent magnet 9, is situated in container 4. Float gauge 8 always lies on the surface of liquid 5, so that its level in container 4 corresponds to the liquid level and the filling level of liquid 5 in container 4. If the filling level sinks, float gauge 8 also sinks in the direction of the bottom of container 4.

In the present exemplary embodiment, switching unit 7 is situated close to the bottom. Switching unit 7 is designed in such a way and float gauge 8 is guided in container 4 in such a way that float gauge 8 magnetically actuates the switching unit only upon reaching a predefinable position close to the bottom, via the magnetic field generated by permanent magnet 9.

Figure 2:
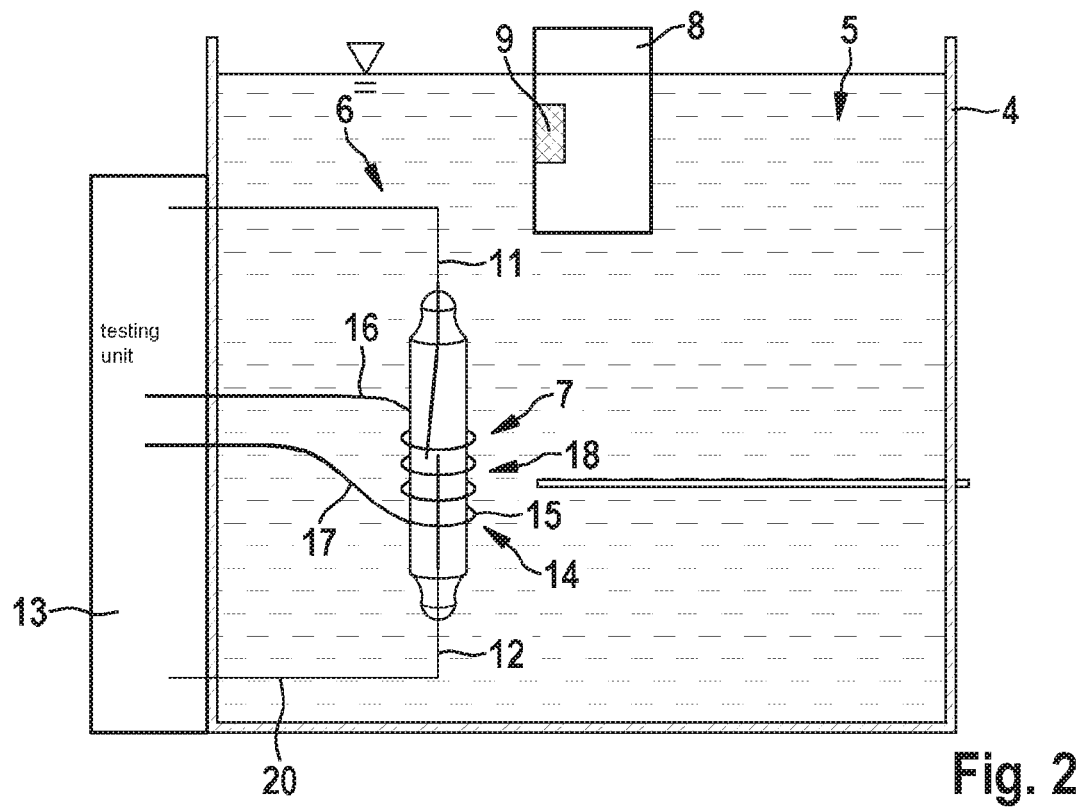
FIG. 2 shows an advantageous unit of the braking system according to a first exemplary embodiment.

FIG. 2 shows, for this purpose, in an enlarged representation, container 4 including unit 6 according to a first exemplary embodiment. Switching unit 7 is designed as a so-called reed contact or reed relay, which includes a control element 10 movable with the aid of the magnetic force of the permanent magnet. According to the present exemplary embodiment, control element 10 is actuated by permanent magnet 9 in such a way that it establishes an electrical connection between a first switch terminal 11 and a second switch terminal 12. According to one alternative exemplary embodiment, it may also be provided that switching unit 7 is designed in such a way that the electrical connection between the two switch terminals 11, 12 is disconnected when permanent magnet 9 reaches switching unit 7 due to the sinking of float gauge 8.

The two switch terminals 11, 12 are connected to a testing unit 13, which is situated at container 4, in particular externally, and is designed for applying a voltage to switching unit 7, so that a current flows through switching unit 7 when control element 10 has been actuated. Testing unit 13 also monitors the current flow, in order to detect, depending on the detected current flow, whether switching unit 7 was actuated by permanent magnet 9 or not. As a result, a critical filling level in container 4 is easily detectable.

In addition, a magnetic device 14 for generating a magnetic field, as necessary, is assigned to switching unit 7. In the present exemplary embodiment, magnetic device 14 is designed as coil 15, which is situated and designed to be coaxial with respect to switching unit 7. Coil 15 includes two coil terminals 16 and 17, which are connected to testing unit 13. Testing unit 13 is designed for applying a voltage to coil 15 at coil terminals 16 and 17, so that a current flows through coil 15 and, as a result, generates a magnetic field, which acts on switching unit 7. Once voltage is sufficiently high, the magnetic field reaches such a high force that switching unit 7 is actuated as a result. An active actuation of switching unit 7 is therefore possible by switching on or energizing coil 15. Alternatively to the embodiment as a coil, an electromagnet could also be assigned to switching unit 7, which is situated next to switching unit 7, in order to actuate switching unit 7 as necessary.

Due to advantageous unit 6, the advantage now results that the functional capability of switching unit 7 is checkable at any time. In this way, in particular regularly, for example, after every start of braking system 1 or at regular time intervals, coil 15 is activated via testing unit 13 or is acted upon by a voltage, which is increased over time. Simultaneously, the current flowing through switching unit 7 is monitored by testing unit 13. If it is detected that the current profile of the detected current undergoes a sudden increase, it is assumed that the generated magnetic field has effectuated a switching of switching unit 7.

Figure 4:
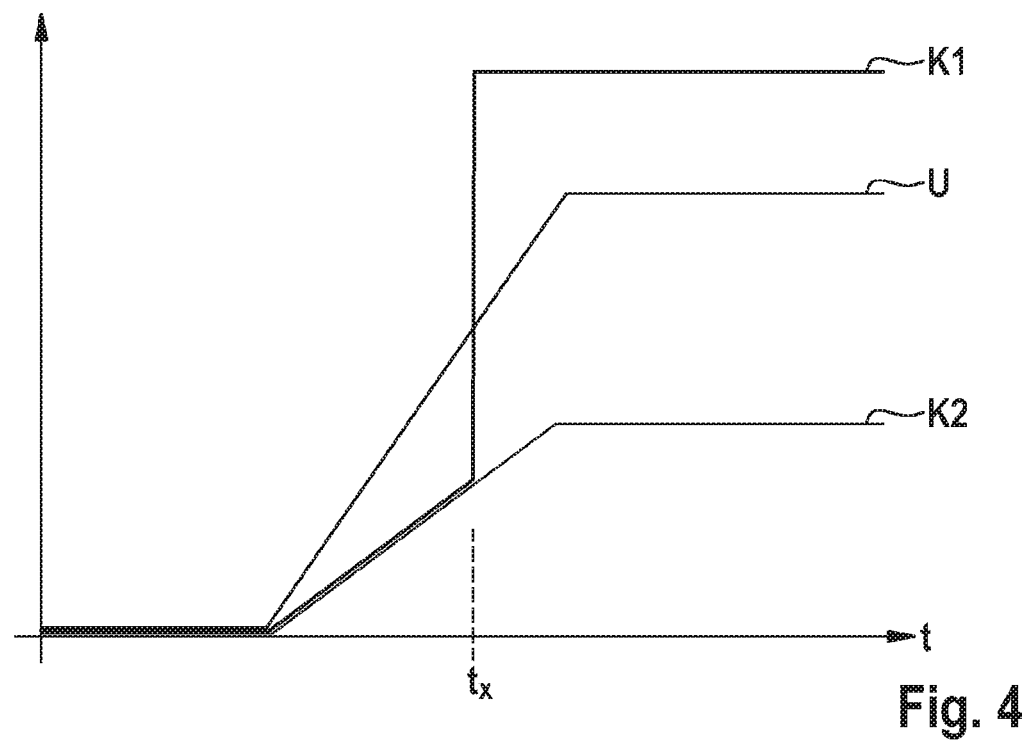
FIG. 4 shows a diagram for explaining the unit.

This is explained in greater detail in a diagram with reference to FIG. 4. Applied voltage U and detected current i, which flows through switching unit 7, are plotted over the time t. A first curve K1 shows the profile of the current in the normal case, when switching unit 7 has no malfunctions. The switching is apparent at a point in time $t_x$, because, hereafter, the current value suddenly increases. Voltage U is slowly increased, in order to be able to easily detect switch point in time $t_x$.

If switching unit 7 is defective, however, so that no switching takes place, the current profile will not contain the jump shown in curve K1, as shown by a curve K2, and malfunctions of switching unit 7 are detected.

Figure 3:
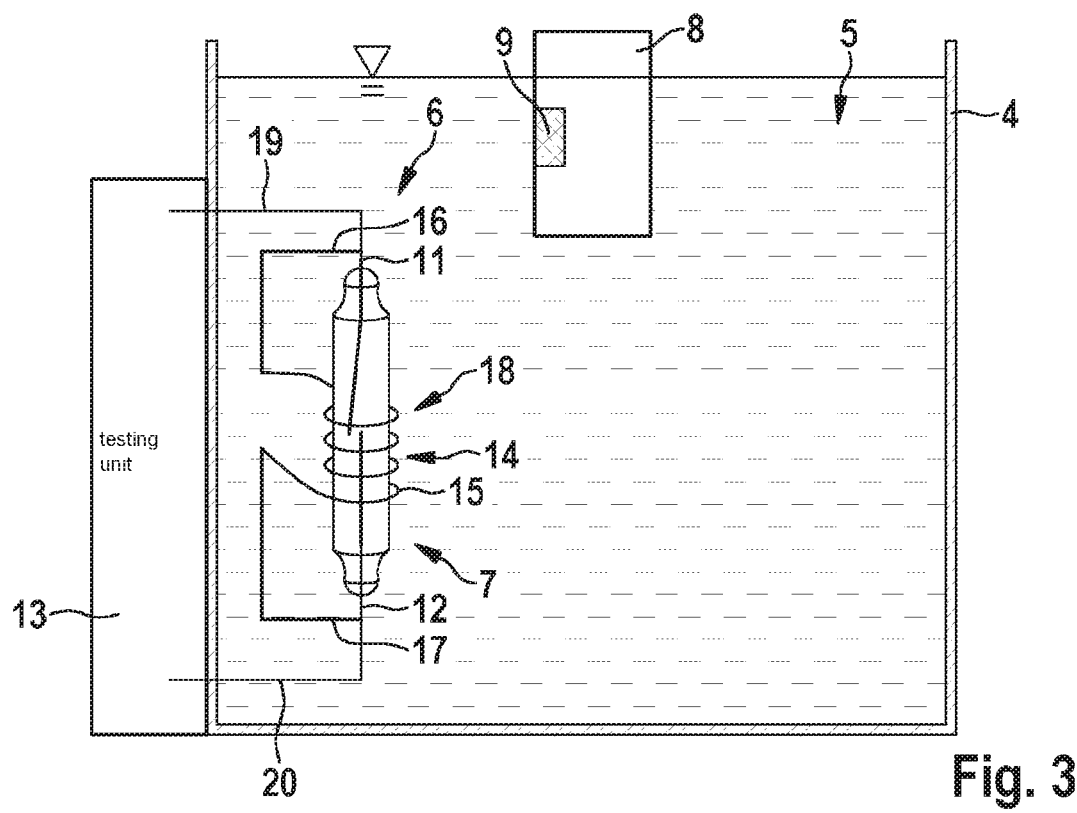
FIG. 3 shows the unit according to a second exemplary embodiment.

FIG. 3 shows one further exemplary embodiment of unit 6, which differs from the preceding exemplary embodiment in that coil terminal 16 is directly connected to switch terminal 11 and coil terminal 17 is directly connected in switch terminal 12, so that coil 15 or magnetic device 15 and switching unit 7 form a unit 18, which is designed, in particular, as a module or as a handleable unit, which includes only two contact terminals 19 and 20, which represent combined terminals 11, 16 and 12, 17, respectively, and extend to testing unit 13.

This embodiment has the advantage that only two lines must be routed from unit 18 in the direction of testing unit 13, through container 4 and its wall. As a result, the wiring complexity as well as the sealing complexity are reduced. Nevertheless, the functional capability of switching unit 7 is also establishable with the aid of this embodiment of unit 6. In order to carry out the function test, testing unit 13 increases voltage U present at contact terminals 19 and 20. Initially, only the current in coil 15 is increased, so that the detected current also increases, although in proportion to the increase of the applied voltage, as shown in FIG. 4 on the basis of curve K1. If switching unit 7 is error-free, it switches as soon as the magnetic field generated by coil 15 has reached the sufficient switching force. In that moment, the detected current also abruptly rises, as shown in FIG. 4 after point in time $t_x$. If switching unit 7 is defective, this jump would fail and, thereby, the functional capability of switching unit 7 would be reliably detected (curve K2).

Float gauge 8 is preferably guided in container 4, for example, with the aid of a guide rail or bar 21, which prevents float gauge 8, including permanent magnet 9, from moving too far away from switching unit 7, so that switching unit 7 could no longer be actuated by permanent magnet 9.

While it is assumed with respect to the present exemplary embodiments that the switching unit is a closer unit, which, once magnetically actuated, therefore establishes the electrical contact between switch terminals 11, 12, it is provided according to a further exemplary embodiment (not represented here), that switching unit 7 is an opener unit, in the case of which, once magnetically actuated, the electrical contact between switch terminals 11, 12 opens and, as a result, the current flow through switching unit 7 is interrupted. A switch point in time is also apparent, however, in the form of a suddenly dropping current value in the current measurement curve.

Due to advantageous unit 6, therefore, overall, a reliable operation is ensured for determining the filling level and also for detecting a malfunction.

What is claimed is:

1. A unit for detecting a filling level of a liquid in a container, comprising:
   a float gauge which carries at least one permanent magnet;
   a switching unit that:
      includes a first switch terminal, a second switch terminal, and a connecting section that is switchable, by the permanent magnet, to connect the first switch terminal and the second switch terminal to each other; and
      is fastened in or at the container; and
   an energizable magnetic device that, in response to an actuation of the energizable magnetic device, is configured to generate a magnetic field to connect the first switch terminal and the second switch terminal to each other when the switching unit is functional;
   wherein the unit for detecting:
      is configured such that:
         when the switching unit is functional, an electric current generated by the actuation gradually increases with a first gradient for a first period of time, upon conclusion of which the electric current abruptly rises at a second gradient that is higher than the first gradient; and
         when the switching unit is non-functional, the electric current generated by the actuation gradually increases with the first gradient for the first period of time and continues to gradually increase with the first gradient upon conclusion of the first period of time; and
      is configured to, after the actuation, determine whether the abrupt rise of the electric current at the second gradient occurs upon completion of the first period of time after the actuation.

2. The unit as recited in claim 1, wherein the magnetic device is an energizable coil.

3. The unit as recited in claim 2, wherein the coil is coaxial with respect to the switching unit.

4. The unit as recited in claim 1, wherein the switching unit and the coil are electrically connected to a testing unit, the testing unit being configured to detect the electric current.

5. The unit as recited in claim 4, wherein the magnetic device is an energizable coil that includes a first electrical coil terminal and a second electrical coil terminal; and
   the first switch terminal and the second switch terminal are directly connected to the testing unit separately from a direct connection of the first electrical coil terminal and the second electrical coil terminal to the testing unit.

6. The unit as recited in claim 1, wherein a first end of the energizable magnetic device is electrically connected to the first switch terminal and a second end of the energizable magnetic device is electrically connected to the second switch terminal for application of voltage to the energizable magnetic device via the first and second switch terminals.

7. A braking system for a motor vehicle, comprising:
a hydraulic circuit which includes at least one container storing and providing brake fluid, wherein the container includes a unit for detecting a filling level of the brake fluid in the container, the unit for detecting including:
   a float gauge which carries at least one permanent magnet;
   a switching unit that:
      includes a first switch terminal, a second switch terminal, and a connecting section that is switchable, by the permanent magnet, to connect the first switch terminal and the second switch terminal to each other; and
      is fastened in or at the container; and
   an energizable magnetic device that, in response to an actuation of the energizable magnetic device, is configured to generate a magnetic field to connect the first switch terminal and the second switch terminal to each other when the switching unit is functional;
wherein the unit for detecting:
   is configured such that:
      when the switching unit is functional, an electric current generated by the actuation gradually increases with a first gradient for a first period of time, upon conclusion of which the electric current abruptly rises at a second gradient that is higher than the first gradient; and
      when the switching unit is non-functional, the electric current generated by the actuation gradually increases with the first gradient for the first period of time and continues to gradually increase with the first gradient upon conclusion of the first period of time; and
   is configured to, after the actuation, determine whether the abrupt rise of the electric current at the second gradient occurs upon completion of the first period of time after the actuation.

8. A method for operating a detecting unit, the detecting unit being configured to detect a filling level of a liquid in a container and to output a warning message depending on the detected filling level, the detecting unit including (1) a float gauge which carries at least one permanent magnet, (2) a switching unit that (i) includes a first switch terminal, a second switch terminal, and a connecting section that is switchable, by the permanent magnet, to connect the first switch terminal and the second switch terminal to each other and (ii) is fastened in or at the container, and (3) an energizable magnetic coil that, in response to an actuation of the energizable magnetic coil, is configured to generate a magnetic field to connect the first switch terminal and the second switch terminal to each other when the switching unit is functional, the method comprising:
   applying a voltage to the energizable magnetic coil;
   detecting a current flowing through the switching unit;
   comparing the detected current to an expected current or current profile; and
   determining a functional capability of the switching unit depending on the comparison;
   wherein at least one of the following:
      (a) a first end of the energizable magnetic coil is electrically connected to the first switch terminal and a second end of the energizable magnetic coil is electrically connected to the second switch terminal for the application of the voltage to the energizable magnetic coil via the first and second switch terminals; and
      (b):
         (I) the detecting unit is configured such that:
            when the switching unit is functional, the current is generated by the actuation with a gradual increase at a first gradient for a first period of time, upon conclusion of which the current abruptly rises at a second gradient that is higher than the first gradient; and
            when the switching unit is non-functional, the current generated by the actuation gradually increases with the first gradient for the first period of time and continues to gradually increase with the first gradient upon conclusion of the first period of time; and
         (II) the comparing includes determining, after the actuation, whether the abrupt rise of the current at the second gradient occurs upon completion of the first period of time after the actuation.

* * * * *